United States Patent [19]

Clark

[11] Patent Number: 5,860,090
[45] Date of Patent: Jan. 12, 1999

[54] APPEND-ONLY STORAGE IN A DISK ARRAY USING STRIPING AND PARITY CACHING

[75] Inventor: Thomas K. Clark, Troutdale, Oreg.

[73] Assignee: Informix Software, Inc., Menlo Park, Calif.

[21] Appl. No.: 546,550

[22] Filed: Oct. 20, 1995

[51] Int. Cl.[6] .................................................. G11B 17/22
[52] U.S. Cl. .......................... 711/113; 711/114; 711/112; 395/182.03; 371/51.1
[58] Field of Search ............................... 395/182.04, 441, 395/182.13; 371/51.1; 711/114, 113, 112, 111

[56] References Cited

U.S. PATENT DOCUMENTS

| 5,333,305 | 7/1994 | Neufeld | 395/182.03 |
|---|---|---|---|
| 5,341,381 | 8/1994 | Fuller | 395/182.04 |
| 5,388,108 | 2/1995 | DeMoss et al. | 395/182.04 |
| 5,408,644 | 4/1995 | Schneider et al. | 395/575 |
| 5,517,632 | 5/1996 | Matsumoto et al. | 711/114 |
| 5,522,032 | 5/1996 | Franaszek et al. | 395/182.04 |
| 5,522,065 | 5/1996 | Neufeld | 395/182.04 |
| 5,530,948 | 6/1996 | Islam | 395/182.04 |
| 5,537,354 | 7/1996 | Voigt et al. | 395/182.04 |
| 5,572,660 | 11/1996 | Jones | 395/182.04 |
| 5,594,862 | 1/1997 | Winkler et al. | 395/182.03 |

OTHER PUBLICATIONS

Jai Menon, "Floating Parity and Data Disk Arrays," *J. Parallel and Distributed Computing*, 17:129–139 (1993).

Drapeau et al., "Striped Tape Arrays," *Digest of Papers, 12th IEEE Symposium on Mass Storage Systems*, 257–265, (Apr. 1993).

Agrawal et al., "A Parallel Logging Algorithm for Multiprocessor Database Machines," *Proc. 4th int'l. Workshop on Database Machines*, pp. 257–276, (Mar. 1985).

Akhil Kumar, "A Crash Recovery Algorithm Based on Multiple Logs that Exploits Parallelism," *Second IEEE Symposium on Parallel and Disributed Systems*, Dallas, TX, (Dec. 1990).

DeWitt et al., "Implementation Techniques for Main Memory Database Systems," *Proc. ACM SIGMOND Conf.*, Boston, MA, pp. 1–8 (Jun. 1984).

Agrawal et al., "Recovery Architecture for Multiprocessor Database Machines," *Proc. ACM SIGMOND Conf.*, Austin, TX, pp. 131–145 (May 1985).

Salem et al., "Disk Stripping," *Proc. IEEE Conf. on Data Eng.*, Los Angeles, CA, pp. 336–342 (Feb. 1986).

Michelle Y. Kim, "Synchronized Disk Interleaving," *IEEE Trans. on Computers*, C35(11):978–988 (Nov. 1986).

Patterson et al., "A Case for Redundant Arrays of Inexpensive Disks (RAID)," *Proc. ACM SIGMOND Conf.*, Chicago, IL, pp. 109–116 (Jun. 1988).

Dina Bitton, "Disk Shadowing," *Proc. Int'l. Conf. on Very Large Data Bases*, Long Beach, CA, pp. 331–338 (Aug. 1988).

Schulze et al., "How Reliable is a Raid?" *Proc. IEEE Compcon Spring '89*, pp. 118–123 (Mar. 1989).

Gibson et al., "Failure Correction Techniques for Large Disk Arrays," *Third Int'l. Conf. on Architectural Support for Prog. Lang. and Op. Sys.*, pp. 123–132 (Apr. 1989).

(List continued on next page.)

*Primary Examiner*—Eddie P. Chan
*Assistant Examiner*—Hong C. Kim
*Attorney, Agent, or Firm*—Fish & Richardson P.C.

[57] ABSTRACT

A computer writes information to a series of blocks that form a stripe on a disk array. The computer first checks if the stripe contains data written in a current pass. If the stripe has stored data, but is not completely full, the computer calculates a parity for the stripe (assuming the information is appended to the data). If appending the information to the data would not complete the stripe, the computer caches the parity outside the disk array. The computer appends the information to the data and updates a parity block on the stripe each time information is appended to the stripe. In various implementations, the computer places a stamp on the pages forming the blocks in the stripe to which information is written. Alternatively, the computer zeroes the bits in the remaining blocks to form a complete stripe.

12 Claims, 4 Drawing Sheets

OTHER PUBLICATIONS

Stonebraker et al., "Distributed RAID—A New Multicopy Algorithm," *Proc. IEEE Conf. on Data Eng.,* Los Angeles, CA, pp. 430–437, (Feb. 1990).

Lee et al., "Performance Consquences of Parity in Disk Arrays," *Third Int'l. Conf. on Architectural Support for Prog. Lang. anf Op. Sys.,* pp. 190–199, (Apr. 1991).

Rosenblum et al., "The Design and Implementation of a Log–Structured File System," *ACM Trans. on Computer Sys.,* 10(1):26–52, (Feb. 1992).

Mourad et al., "Database Recovery Using Redundant Disk Arrays," *Proc. IEEE Conf. on Data Eng.,* Tempe, AR, pp. 176–183, (Feb. 1992).

Mohan et al., "ARIES: A Transaction Recovery Method Supporting Fine–Granularity Locking and Partial Rollbacks Using Write–Ahead Logging" *ACM Trans. on Database Sys.,* 17(1):94–162, (Mar. 1992).

Stodolsky et al., "Parity Logging Overcoming the Small Write Problem in Redundant Disk Arrays," *Computer Architecture News,* 2:64–75, (May 1993).

Katz et al., "The Performance of Disk Arrays in Shared–Memory Database Machines," *Distributed and Parallel Databases,* 1:167–198, (1993).

APPEND-ONLY STORAGE IN A DISK ARRAY USING STRIPING AND PARITY CACHING

BACKGROUND OF THE INVENTION

The present invention relates generally to storing information on disks, and more particularly to a method for writing information to an array of independent disks.

Magnetic disks are typically used as secondary storage for computers. Increasing storage needs have prompted improvements in disk capacity, but at a greater user cost.

A less expensive alternative to high storage capacity disks is a disk array, consisting of a set of independent disks linked together as a single data store. The greater number of disks in the array, however, increases the possibility of disk failure. Redundant information storage is therefore necessary to increase the reliability of the array.

In one scheme, a check disk is added to the array to store the parity of the information on the disks. In another scheme, each disk in the array stores some parity information. These schemes are discussed in detail in Patterson et al., "A case for redundant arrays of inexpensive disks (RAID)", Proc. ACM SIGMOD Conf., Chicago, Ill., June 1988, 109.

SUMMARY OF THE INVENTION

The invention features a method for writing information to a redundant array of inexpensive disks (RAID). Each disk in the array has a block of storage space dedicated to a logical grouping called a stripe. The computer stores information in each stripe of the disk array until the array runs out of storage space. At this point, a "pass" has been completed. In the next pass, the computer overwrites the stripes in the array.

In general, in one aspect, the invention features a method for writing information to a stripe by first checking if the stripe already contains data stored in a current pass. If the stripe contains some stored data, but is not completely full, a parity for the stripe (assuming the information is appended to the data) is calculated. If the information is insufficient to complete the stripe, the parity is cached outside the disk array. The information is appended to the data in the stripe and a parity block on the stripe is updated each time information is appended to the stripe.

Preferred embodiments of this aspect of the invention include the following features.

The step of updating the parity includes retrieving the parity stored in the cache during a previous write operation to the stripe. A new parity is calculated by taking the exclusive or of the blocks of information with the old parity.

If a last page of the information is not complete, the remainder of the page is zeroed. A page comprises a smallest input/output unit actually employed by the disk array. Alternatively, the amount of information stored in a last page of information is recorded in a page header. The parity is then updated by calculating the parity of the information, excluding any information in an unused portion of the page.

If no data has been written to the stripe on a current pass, and the information does not comprise a full stripe, zeros are appended to the information to form a full stripe. The parity block for the information is calculated, and the information with the zeroed blocks and the parity block are written to the stripe.

Instead of zeroing the remainder of the information, a stamp may be placed in each page of the information, with each successive page having a stamp greater than the previous page. A lost block on a disk is recovered after the disk experiences a failure by first reading a stripe of information from the disks. The stamp in each page is examined to find the unused pages. This is done by locating a page whose stamp does not exceed the stamp of a previous page by one. All the pages succeeding this previous page are unused. The parity of the stripe is determined based only on the used pages and then compared to the parity block stored on the stripe. The lost block is regenerated from this comparison.

Advantages of the invention include the following.

The invention allows small writes (i.e., information that does not span a stripe) to be written to the array of disks in a highly efficient manner. The invention achieves this without requiring a write operation to be delayed until a full stripe of information is available for writing. The algorithm is thus particularly useful in applications where there are time constraints on the writing operation and where the feed of data to the array is not uniform. This occurs when writing logging transactions or in log-structured file systems.

The parity block for the stripe is updated without reading any information (e.g., the parity block or any old data written in a previous pass) from the stripe. As a result, the new information and the parity block are written to the stripe without first reading any data from the stripe. This significantly increases the speed of each write operation to the array.

The read operations are avoided by ensuring that the parity block on the stripe only accounts for information stored on the stripe in a current pass. As a result, no data accounted for in the parity block is overwritten when information is appended to a stripe. This allows the parity to be recalculated without first reading the data to be overwritten. The correctness of the parity block is ensured by zeroing the remainder of a partial stripe on a first write to the stripe in a current pass. Alternatively, the parity block is defined as including only new data stored in a current pass, and each page of data is marked with a stamp differentiating the new data from old data recorded in a previous pass.

In addition, the invention avoids reading the parity of a partial stripe from the disks by caching the parity in an easily accessible memory. The parity is thus retrieved on a time scale that is orders of magnitude faster than that required to read from a disk.

The algorithm requires no additional disk space and only limited cache memory for implementation.

If a stamp is added to each page, the algorithm not only avoids performing any reads from the disks prior to writing, but the algorithm also does not require the remainder of a partial stripe to be zeroed in a first write to the stripe. Instead, the algorithm only zeroes the remainder of a partial page when writing the partial page to a stripe. The algorithm thus saves the time required to zero the remainder of the partial stripe.

The monotonically increasing stamp easily differentiates pages written in a current pass from pages written in a previous pass. The first page whose stamp does not exceed the stamp of a previous page by one is identified as data written in a previous pass. Any pages succeeding this page in a stripe (but excluding the parity block) are also identified as being written in a previous pass.

This is accomplished by ensuring that the stamp in each consecutive page of data written in a current pass exceeds the stamp in the previous page by one. As a result, when new data is appended to a partial stripe, the first page in the new data has a stamp exceeding that of the last page in the partial stripe by one. Similarly, after a partial stripe is written to the stripe in a second pass, old data stored on the remainder of the stripe in a previous pass has a stamp that is smaller than that of the last page in the partial stripe.

When the stamp in a page reaches its maximum value, the next page has a stamp that is scrolled back to an initial value (e.g., zero). Because the maximum value exceeds the total number of pages in the disk array by more than one, returning the stamp to zero does not cause errors. For example, if the last page in a partial stripe has a zero stamp, the page of old data succeeding it in the stripe is guaranteed to have a stamp greater than one. Because the old page's stamp does not exceed the new page's stamp by one, the computer will determine that the partial stripe ends at the old page.

Because the parity is written to the disk array each time information is written to the stripe, the memory where the parity is cached is not required to be fault tolerant. Any parity lost from the cache can be recovered by reading the appropriate parity block from the disk array.

Other features and advantages of the invention will become apparent from the following description and from the claims.

DESCRIPTION OF THE PREFERRED EMBODIMENTS

Figure 1:
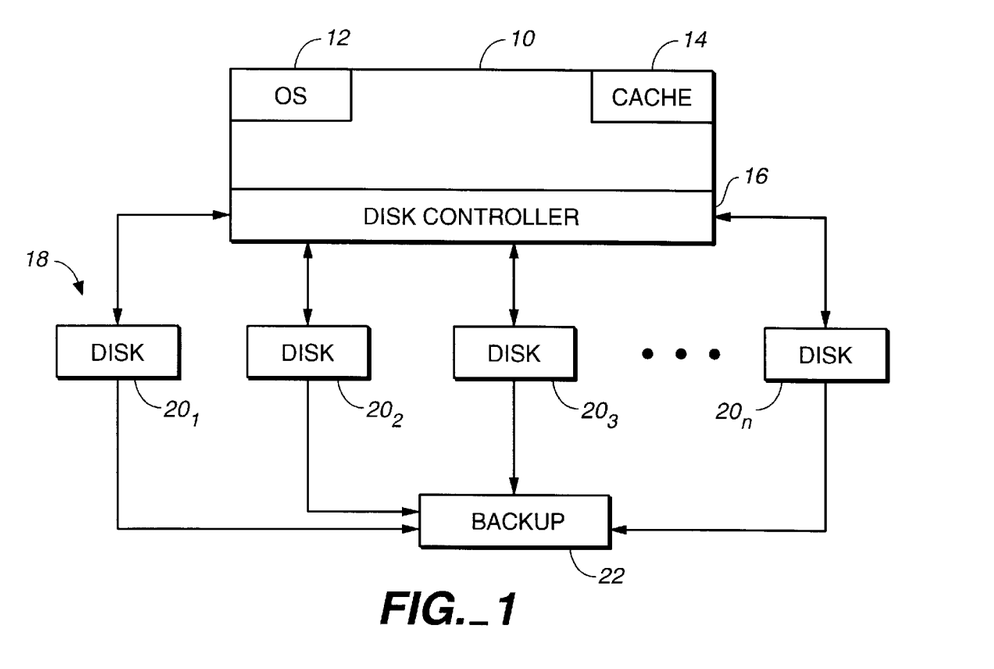
FIG. 1 is a schematic representation of a computer with a disk array.

Referring to FIG. 1, a computer 10 has an operating system (OS) 12, a cache memory 14 (e.g., a standard random access memory or RAM) and a disk controller 16 connected to secondary storage. The secondary storage includes a disk array 18 of (n) disks $20_1$, $20_2$, ... ,$20_n$, each of which is independently connected to the disk controller and to a backup storage device 22 (e.g., a magnetic tape). Alternatively, the computer may be connected directly to the backup device for writing a duplicate of the information stored on the disk array directly to the backup device.

The disk array is used for storing data in a variety of applications, for example, storing logging transactions, i.e., a list of operations performed on data in the computer that is used to recover the data in the event of a failure. Another example is storing information in a file system, particularly in a log-structured file system.

Figure 2:
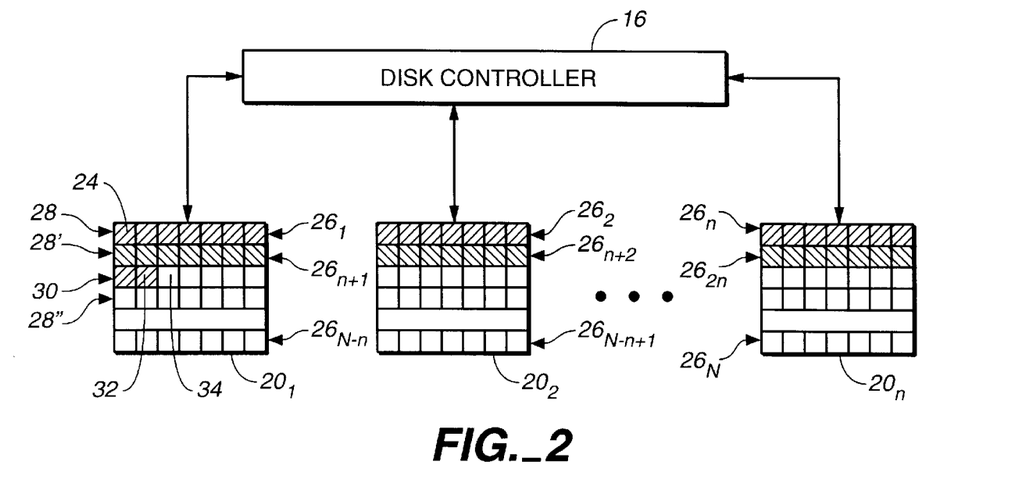
FIG. 2 is a schematic representation of the disks in the array of FIG. 1.

The disk controller writes and reads information to the disk array in a series of discrete operations, in response to write and read requests from the operating system. Referring to FIG. 2, in each operation, the computer writes or reads a fixed number of bits, or a page 24, to or from a disk. Each page 24 is thus the smallest input/output (I/O) size actually used in an operation, and is typically 512 bytes. For performance reasons, the page is a multiple of the smallest I/O size (a unit) that does not require a read/modify/write operation to a disk. In some modes, an input or output to a disk will fail if it is not performed as a multiple of a unit.

The information which the computer writes on the disks in response to a write request typically exceeds a page in size. In these cases, the computer stores a block (e.g, block $26_1$) consisting of a fixed number of pages on a disk (e.g., disk $20_1$). In the example shown, one block includes seven pages. If the information exceeds a block in size, the computer stores the information on successive blocks $26_2$, ... ,$26_x$ on disks $20_2$, ... ,$20_x$, respectively, until all the information is stored. The disk controller typically writes the blocks to the disks in parallel.

If the information is large enough so that a block is written on each disk (and thus x=n), then a full stripe 28 of data is written on the disk array. Stripe 28 thus consists of blocks $26_1$, $26_2$, ... ,$26_n$. If the information to be written exceeds a full stripe in size, the computer continues writing the information in a second stripe consisting of blocks $26_{n+1}$, $26_{n+2}$, ... ,$26_{2n}$. If the information written by the computer is less than an integer number of stripes, a partial stripe (e.g., consisting of blocks $26_1$, $26_2$) may be written to the disks. In addition, if the information is not divisible into a whole number of blocks, a partial block 30 (consisting of two pages) may be written to one of the disks.

In order to increase the reliability of the disk array, redundant parity information for each stripe is stored as a block on one disk in the array. For example, in stripe 28, block $26_1$ is reserved for the parity of blocks $26_2$, ... , $26_n$. In the next stripe, the parity block is block $26_{n+2}$ on disk $20_2$. Storing the parity on different disks prevents a backlog of parity write requests from accumulating for a single disk. This scheme is generally known as RAID level 5.

While the parity is always written to the designated parity block, the computer writes the other information to the disk array in an append-only fashion. At the beginning of each write operation, the computer locates the position on the disk where the last write operation ended, e.g., at the last page (page 32) of partial block 30. This location is usually cached in the primary memory for easy retrieval. The computer then begins writing information to the page following that location (e.g, page 34), after verifying that the page is not part of a block reserved for parity information. When each disk in the array is full of information, the computer begins to repeat the process described above by overwriting the first block written on the first disk in the array, e.g., block $26_1$.

The computer writes each stripe and its parity to the disk array using the following algorithm. The algorithm is implemented either directly in the hardware of the disk controller or in the operating system software of the computer, which directs the disk controller. The term "computer" is used in what follows to refer generically to either implementation.

Figure 3:
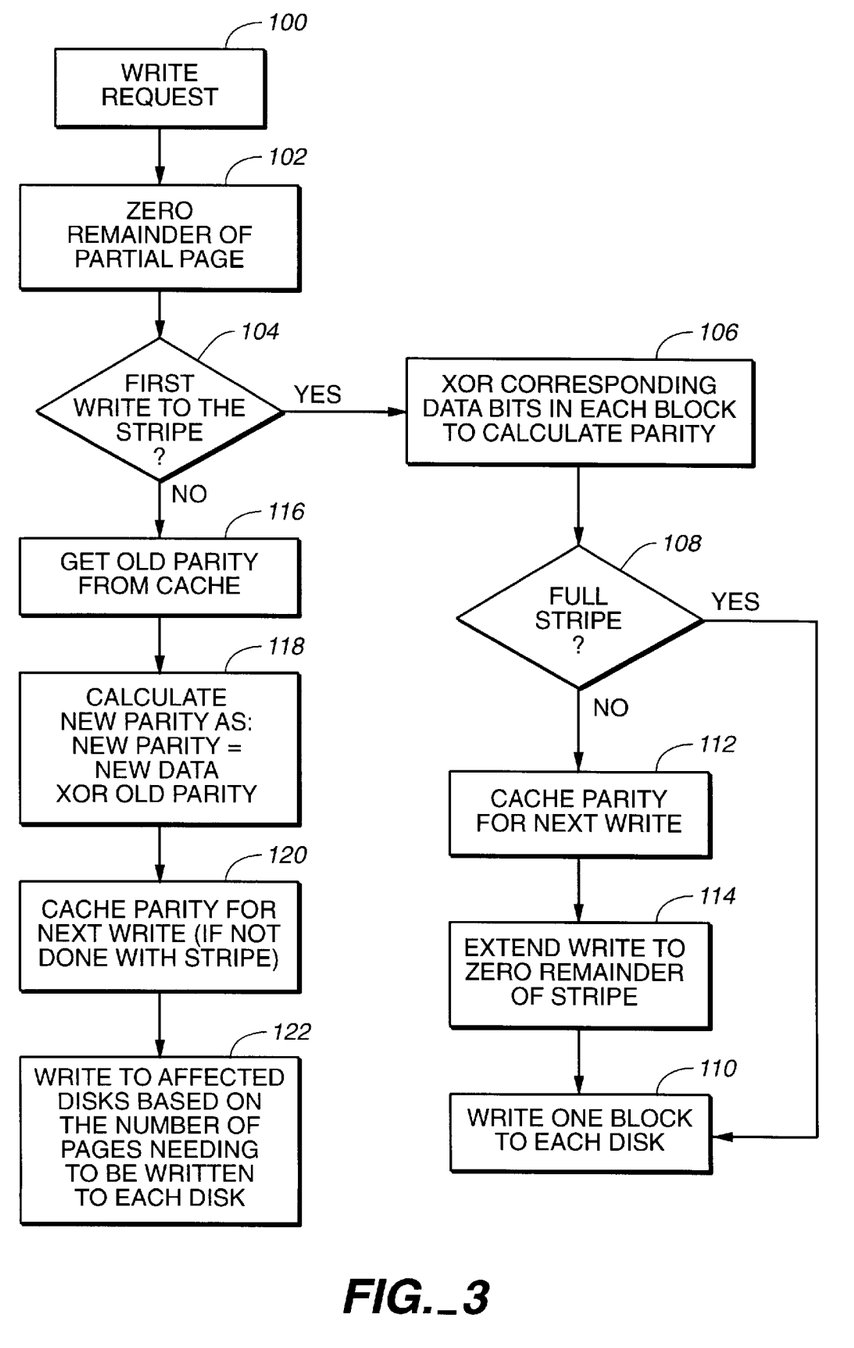
FIG. 3 is a flowchart for writing information to the disk array of FIG. 1.

Referring to FIG. 3, after receiving a write request (step 100), the computer divides the information to be written into stripes. For example, information two and a half stripes long is divided into two stripes and a partial stripe. Each set of information corresponding to a stripe (or a partial stripe) is then written to the disks sequentially, in the following steps.

After the computer receives the first set of information, it divides the information into pages. If the last page is only partially full of data, the computer zeroes the remaining bits of the page (step 102). Because the computer must write the entire page to the disk (the page is the smallest I/O size employed by the computer and the disks), zeroing the remainder of the page is necessary to prevent any noise in the remainder of the page from being written to the disk. This ensures that parity calculations for the stripe during crash recovery are free from errors.

The computer next determines if the starting point of its write operation corresponds to a stripe that has not yet been written to in the current pass (e.g., stripe 28" in FIG. 2), or whether it is appending data to a previously written partial stripe (e.g., block 30 in FIG. 2) (step 104).

If the computer is writing to the stripe for the first time in the current pass, the computer calculates the parity block for the information by performing an exclusive or of the corresponding data bits in each page of each block (step 106). For example, if the information consists of the blocks (0011), (1101) and (0111), the resulting parity block is (1001). If a block is only partially full, and thus has some empty pages, the computer does not include the empty pages in its parity calculation. This yields the correct parity value because any data written to the stripe in a previous pass will not be retained in the stripe (see step 114). (A condition necessary for this assumption to hold is discussed below).

The computer then determines whether the information spans a full stripe (step 108). For example, the computer determines whether the number of bits of information (plus one block of parity bits) equals the number of bits in a stripe. If it does, the computer writes one block of information (including the parity block) to each disk in the array to fill a full stripe (step 110).

If in step 106 the computer determines that the information does not span a full stripe (i.e., it is a partial stripe), the computer caches the parity of the information in the computer's primary memory (step 112). The computer then adds zeros to the end of the partial stripe to create a full stripe (step 114), and writes the full stripe and its parity to the disks (step 110). Zeroing the remainder of the partial stripe prevents any old data written in a previous pass from remaining in the stripe and being read back by the computer as new data. In addition, zeroing the partial stripe ensures that the parity calculation during a crash recovery is free of errors.

If in step 104 the computer determines that this is not the first write to the stripe, i.e., the computer is appending data to a partial stripe written in the current pass, the computer retrieves the parity for the stripe from the cache (step 116). The computer then calculates a new parity for the stripe by performing an exclusive or of the new data blocks to be written to the stripe and the old parity retrieved from the cache (step 118). This formula holds because the remainder of the first partial stripe is zeroed in step 114, and thus the new blocks are not overwriting any old data on the stripe (that would have been included in the old parity value).

If the new data does not fill the stripe, the new parity is cached (step 120). If however, the data does complete the stripe, it is not necessary to cache the parity. This is because no new data will be appended to the stripe, and thus a cached parity will not be retrieved to update the parity of the stripe in any subsequent write.

In either case, the computer appends the information to the stripe and updates the parity block of the stripe (step 122). For example, if 15 pages of information are appended to partial stripe 30 of FIG. 1, the first five pages are added to disk 26₁, the next seven pages are written to the appropriate block on disk 26₂ and the last three pages are written to disk 26₃ (not shown). In this example, the information does not complete the stripe, so the parity of the stripe is cached in step 120.

If the information not only completes the stripe but exceeds it, only the information necessary to complete the stripe is written to the disks. The excess information is then treated as a new stripe or partial stripe, and the process returns to step 102.

Figure 4:
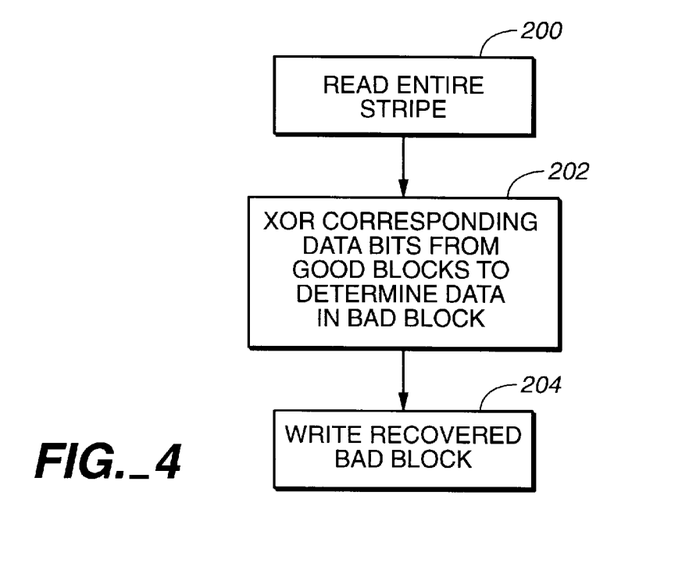
FIG. 4 is a flowchart for recovering information stored in the disk array according to FIG. 3 after a disk failure.

If a disk in the array fails, the information on that disk is recovered as follows. Referring to FIG. 4, after replacing the failed disk, the computer reads an entire stripe from the disks (step 200). The computer then performs an exclusive or of the corresponding data bits in the blocks in the good disks to calculate the parity (step 202). The computer compares the calculated parity to the parity block stored on the stripe to recover the block lost in the failed disk. For example, if a bit in the calculated parity corresponds to the bit in the parity block, then the lost bit was zero, and if it does not correspond, the lost bit was a one. The recovered block is then written to the new disk (step 204).

If the lost block contained the parity, then the calculated parity is simply written to the new disk. The computer then repeats the process for each stripe in the array.

Another method of writing information to the disk array will now be discussed. The append-only algorithm of FIG. 5 avoids zeroing the remaining blocks in a partial stripe, as follows.

Figure 5:
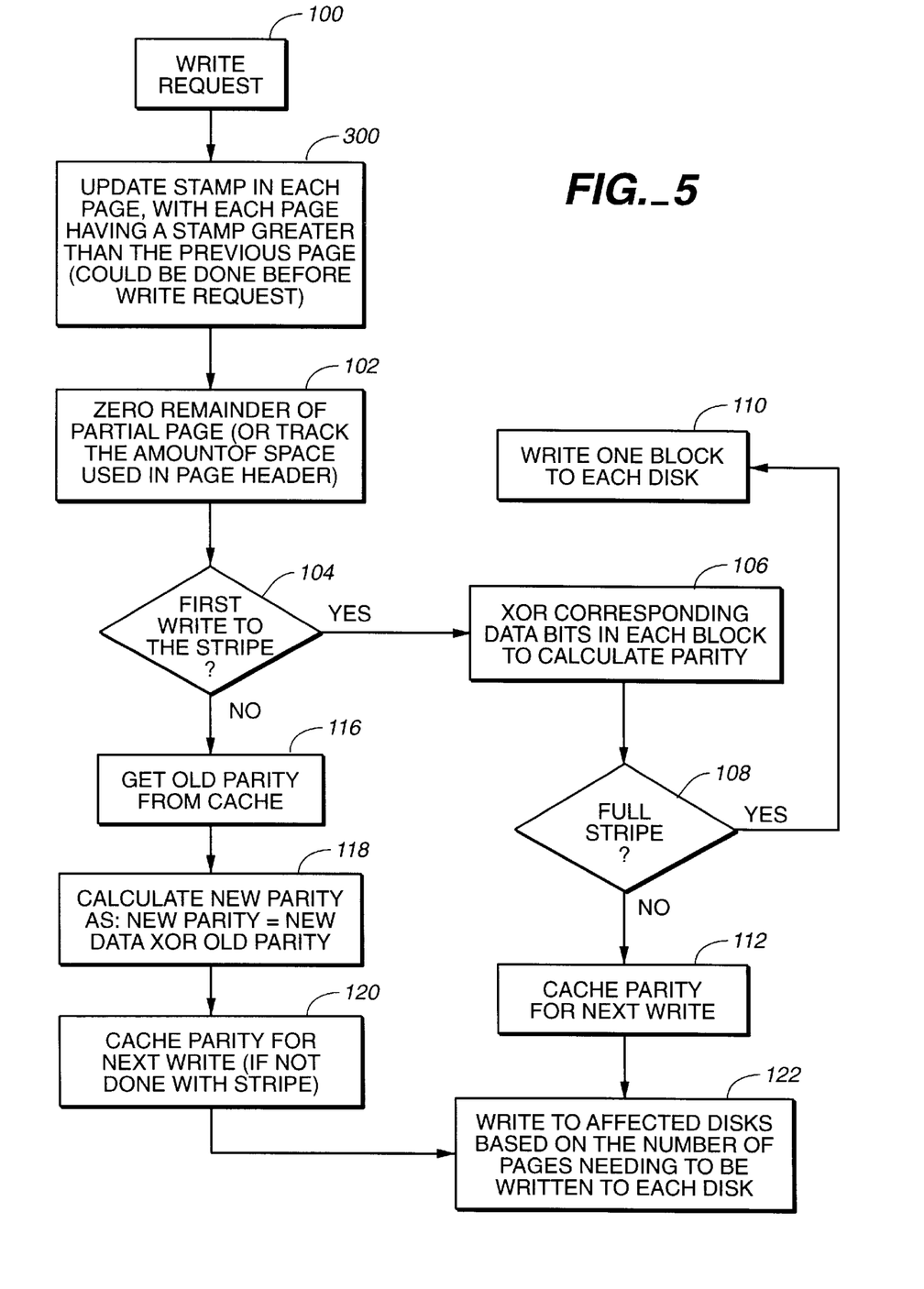
FIG. 5 is a flowchart for another method of writing information to the disk array of FIG. 1.

After receiving a write request (step 100), the computer divides the information to be written into pages, and places a monotonically increasing, integer-valued stamp in each successive page (step 300). For example, four bytes in each page are reserved for storing the stamp. The number of bytes reserved for the stamp must be large enough to allow the maximum value of the stamp to exceed the total number of pages stored in the disk array by at least one. Alternatively, the stamps are placed in each page of data before the write request is received.

The computer zeroes the remainder of the last page (step 102), and checks whether this is the first write to the stripe in this particular pass (step 104). If it is, the computer calculates the parity of the partial stripe using only the data bits in each used page (step 106).

The computer then proceeds to check if the information to be stored spans a full stripe (step 108), in the manner described above. If it does, the computer writes one block of information (including the parity block) to each disk in the array (step 110).

If in step 108 the computer determines that the information does not span a full stripe (i.e., it is a partial stripe), the computer caches the parity for the next write (step 112). The computer then writes the appropriate number of pages to each disk in the array (step 122). For example, if 15 pages of information are written to stripe 28" in FIG. 1, the first seven pages are written to the appropriate block on disk 26₁, the next seven are written to disk 26₂ and the last page is written to disk 26₃ (not shown). The computer does not zero the remainder of the stripe before writing the partial stripe to the disks.

If this is not the first write to the stripe in the current pass, i.e., the computer is appending data to a previously written partial stripe, then the computer performs steps 116 through 122, as described in connection with FIG. 3.

It is important to ensure that all the disks in the disk array are zeroed prior to writing the first pass. This prevents the computer from accidentally identifying noise or old data on the disks as a valid stamp.

Figure 6:
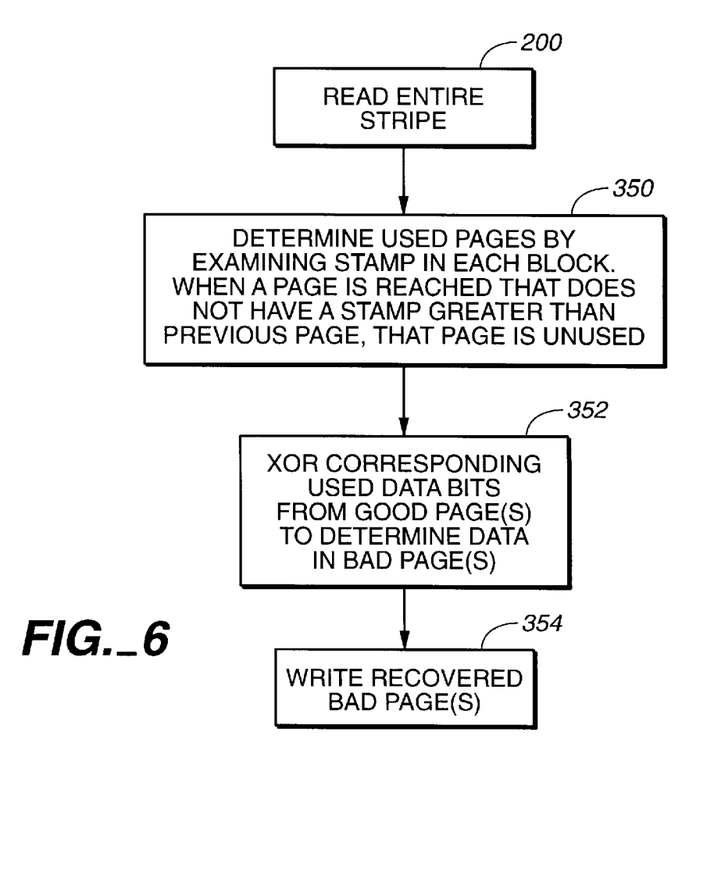
FIG. 6 is a flowchart for recovering information stored in the disk array according to the method of FIG. 5.

The computer recovers the information in a failed disk as follows. Referring to FIG. 6, after the failed disk is replaced, the computer reads a stripe (step 200). The computer examines the stamp in each block to determine the used pages (step 350). When a page is reached whose stamp does not exceed the stamp on the previous page by one, that page is unused. The computer then determines the parity of the stripe using only the used pages (step 352). The calculated parity is then compared to the parity stored in the stripe to regenerate the pages of lost data. The lost data is then written to the new disk (step 354).

If the lost data included the parity block, the calculated parity for the stripe is instead written to the new disk. The process is then repeated for each stripe on the disk array.

In another embodiment, the remainder of the partial page is not zeroed in step 102 of either FIG. 5 or FIG. 3. Instead, the amount of space used in the partial page is stored in the page itself, for example, in a page header. When the parity is calculated in step 106 or step 118, the computer first reads the header to determine where the partial page ends. The computer then uses only the used bits in the page to calculate the parity block. This is analogous to assuming that the remaining bits in the page are zero. The same procedure is followed when the parity is calculated during recovery, in step 350 of FIG. 6 and step 202 of FIG. 4.

This scheme requires a few bits of the page to be dedicated to the header but avoids the overhead of zeroing the rest of the page.

In addition, each of the schemes described above may be employed in a RAID level 4 rather than a RAID level 5 architecture.

In some embodiments, the backup device 22 (FIG. 1) is omitted. The backup device is most useful for archiving information that is older than that on the disk array or to allow for recovery in the event of a large-scale destruction of the array.

In all the embodiments described above, it is essential that the computer ensures that new data is separated from the oldest live data on the array by more than one stripe. This requires the computer to treat the oldest live data on the array as a full stripe, even if the data does not occupy the entire stripe. For example, in a logging application, the oldest live log data is data that is not yet backed up or is still recording operations in a currently open transaction. When the computer fills the disk array and returns to the position of the oldest live log data in a new pass, it cannot overwrite the live data. If the live log data is a partial stripe, the computer would try to append new data to the stripe, violating the assumption that there is no old parity in the initial write to a stripe (e.g., in step 104 in FIG. 3). However, if the computer records the live log data as occupying the entire stripe, the computer will not write new data to the stripe. Instead, the computer will move on to a stripe it is free to overwrite (i.e., that does not contain live log data), and the assumption that there is no old parity will hold.

The present invention has been described in terms of a preferred embodiment. The invention, however, is not limited to the embodiment depicted and described. Rather, the scope of the invention is defined by the appended claims.

What is claimed is:

1. A method for writing information to a stripe on an array of independent disks, the stripe comprising a series of blocks spanning the disks, the method comprising:
   determining whether data has been written to the stripe in a current pass;
   if data has been written to the stripe, determining a parity value for the stripe assuming the information is appended to the data;
   caching the parity value outside the disk array, only if appending the information to the data would not complete the stripe;
   appending the information to the date; and
   updating a parity block on the stripe each time information is appended to the stripe.

2. The method of claim 1 further comprising:
   if no data has been written to the stripe on a current pass, and the information does not comprise a full stripe, zeroing the remaining blocks of the information to form a full stripe;
   determining a parity value for the information; and
   writing the information with the zeroed blocks and the parity value to the stripe.

3. The method of claim 1 wherein the step of updating the parity block comprises:
   retrieving the parity value stored in the cache during a previous operation to the stripe;
   determining a new parity value based on the cached parity value and the information; and
   replacing the value of the parity block on the stripe with the new parity value.

4. The method of claim 3 wherein calculating the new parity value comprises taking the exclusive OR of the blocks of information with the parity value retrieved from the cache.

5. The method of claim 1, further comprising:
   zeroing the remainder of a last page of the information, if a last page of the information is not complete, where a page comprises a smallest input/output unit actually employed by the disk array.

6. The method of claim 1, further comprising:
   recording the amount of information stored in a last page of information in a page header, if a last page of the information is not complete, where a page comprises a smallest input/output unit actually employed by the disk array.

7. The method of claim 6, wherein updating the parity block comprises calculating a parity value of the information, excluding the information in an unused portion of the page.

8. The method of claim 1, further comprising:
   placing a stamp in each page of the information, with each successive page having a stamp greater than the previous page, a page comprising a smallest input/output unit actually employed by the disk array.

9. The method of claim 8, further comprising:
   recovering a lost block on one disk after the disk experiences a failure, wherein recovering includes:
   reading a stripe of information from the disks;
   examining the stamps in each page to find unused pages;
   determining a parity value of the stripe based only on used pages;
   comparing the parity value of the stripe to a parity value stored in the stripe; and
   regenerating the lost block based on the comparison.

10. The method of claim 9 wherein the step of examining the stamps comprises finding a page whose stamp does not exceed the stamp of a previous page by one, and determining that all the pages succeeding the previous page are unused.

11. A method for writing information to a stripe on an array of independent disks, the stripe comprising a series of blocks spanning the disks, the method comprising:
   determining whether data has been written to the stripe in a current pass;
   if the stripe has not been written to in the current pass, calculating a parity value for the stripe;
   caching the parity value, only if the information does not span a full stripe;
   adding zeroes to the information to form a full stripe;

writing the information, including the zeroes, and the parity value to the stripe, one block of the information being stored on each disk;

if the stripe has been written to in the current pass, retrieving the parity value cached in a previous write operation;

calculating a new parity value based on the information and the cached parity value;

caching the new parity value only if appending the information would not complete the stripe;

updating a parity block on the stripe based on the new parity value; and appending the information to the stripe.

12. A method for writing information to a stripe on an array of independent disks, the stripe comprising a series of blocks spanning the disks, the method comprising:

dividing the information into pages, each page being a smallest input/output unit for a disk in the array, and placing a monotonically increasing stamp in each page;

determining whether the stripe has been written to in a current pass;

if the stripe has not been written to in the current pass, calculating a parity value for the information;

caching the parity value if the information does not span the stripe;

writing the information and the parity value to the stripe, one block of the information being stored on each disk;

if the stripe has been written to in the current pass, retrieving the parity value cached in a previous write operation;

calculating a new parity value based on the information and the cached parity value;

caching the new parity value only if appending the information to the stripe would not complete the stripe;

updating a parity block on the stripe based on the new parity value; and appending the information to the stripe.

* * * * *